United States Patent [19]

Ishii et al.

[11] 4,378,965
[45] Apr. 5, 1983

[54] SPROCKET WHEEL FOR PHOTOGRAPHIC CAMERA

[75] Inventors: Shizuo Ishii; Saburo Yoneyama, both of Hachioji, Japan

[73] Assignee: Konishiroku Photo Industry Co., Ltd., Tokyo, Japan

[21] Appl. No.: 123,510

[22] Filed: Feb. 22, 1980

[30] Foreign Application Priority Data

Feb. 28, 1979 [JP] Japan .................... 54/25773[U]

[51] Int. Cl.³ .................................................. F16H 19/00
[52] U.S. Cl. ....................... 474/161; 474/152; 74/457; 74/462
[58] Field of Search ............... 474/152, 161; 74/437, 74/457, 459.5, 460, 462

[56] References Cited

U.S. PATENT DOCUMENTS

| | | | |
|---|---|---|---|
| 779,165 | 1/1905 | Junghans | 474/152 |
| 3,969,947 | 7/1976 | Martin et al. | 474/152 |
| 4,051,744 | 10/1977 | Oshima | 74/437 |
| 4,078,445 | 3/1978 | Kiser, Jr. | 474/161 |
| 4,148,225 | 4/1979 | Redmond, Jr. et al. | 474/152 |

FOREIGN PATENT DOCUMENTS 1125649 6/1955 France .................... 474/152

*Primary Examiner*—Kenneth Dorner
*Attorney, Agent, or Firm*—Linda G. Bierman; Jordan B. Bierman

[57] ABSTRACT

An improved sprocket wheel for substantially planar feeding of a strip of film in a photographic camera by applying a thrust to end edges of two parallel and spaced apart rows of perforations provided along the film strip includes two corresponding trains of film feeding teeth, each tooth having a curved film thrusting surface confronting the plane along which film is fed in the camera and comprising a base portion having a gentler slope with respect to the film feeding plane than an involute tooth profile and an upper portion having a steeper slope with respect to the film feeding plane than an involute tooth profile, and further having a ridge defined between the outer side surface and the film thrusting surface of each tooth to substantially conform to a rounded corner of each film perforation and thereby facilitate smooth feeding of the film.

2 Claims, 8 Drawing Figures

SPROCKET WHEEL FOR PHOTOGRAPHIC CAMERA

BACKGROUND OF THE INVENTION

The present invention relates to improvements in a sprocket wheel for use in a photographic camera.

An involute curve is applied to the tooth form which is used in each tooth of a sprocket wheel for a conventional camera, in order to reduce sliding friction between the film perforations and the teeth. Although this conventional tooth form can generally be considered useful in that the transmission of rotative motion is conducted smoothly, the fact that the amount of sliding friction associated therewith is small sometimes presents a disadvantage in certain kinds of cameras.

More particularly, this adverse phenomenon occurs in cameras wherein the range of meshing angle between the film perforations and the teeth on the sprocket gear is relatively small.

Generally, in the so-called 35 mm frame size (36 mm×24 mm) camera, sprocket wheels having a large outside diameter and 8 teeth arranged with equal angles about its outer periphery so that the rotation of the sprocket wheel necessary to advance one frame is exactly 360°, or having a small outside diameter (as compared to the former example) and 6 teeth whereby the rotation thereof necessary to advance the film one frame is greater than 360° so that the size of the camera is small, are known. In the former case, even when the sprocket wheel meshes with film disposed in a straight line, the range of meshing angle between the sprocket wheel teeth and the film perforations is broad due to the relatively large outside diameter and the many (8) teeth, and advancing of the film is therefore conducted smoothly in the film winding operation. However, in the latter case, the range of meshing angle between the sprocket wheel teeth and the film perforations is notably narrow. During sprocket wheel rotation in this latter case, therefore, the film tends to rise or be lifted up along the tooth profile as a result of the aforesaid reduced sliding friction between the film and engaging teeth to such an extent that the film perforation sometimes disengages completely from the sprocket gear. Such phenomenon is especially pronounced in cameras in which the leading edge of the film inserted into the camera is fed into the film take-up chamber by the winding or feeding motion of the sprocket wheel alone, and in automatic film loading cameras in which the leading edge of the film is wound round the take-up spool by the feeding motion of the sprocket wheel and the film transporting resistance is great or the placement of the film guide roller promotes the problem. As a consequence, in cameras in which the film winding motion by the sprocket wheel is effected by a motor actuated when the back lid of the camera is closed, it sometimes happens that the film is not actually being wound or advanced—unbeknownst to the user since it cannot always be determined from outside of the camera whether the film has riden up along the tooth profile and disengaged completely from the rotating sprocket wheel.

SUMMARY OF THE INVENTION

The object of the present invention is to provide a sprocket wheel for use in a camera, the sprocket wheel being equipped with film-engaging teeth having a profile of predetermined shape to prevent the film from rising up along the teeth, to thereby avoid disengagement of the film with the sprocket wheel.

The present invention will now be explained on the basis of the following exemplary embodiment as applied to an automatic film loading camera utilizing a film advancing motor.

DETAILED DESCRIPTION OF THE PREFERRED EMBODIMENT

Figure 4:
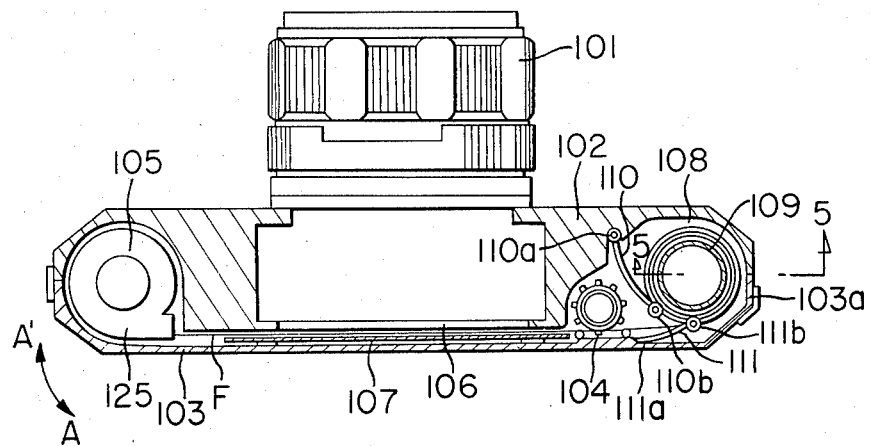
FIG. 4 is a cross-sectional top plan view of an automatic film loading camera utilizing a sprocket wheel in accordance with the present invention.
Figure 5:
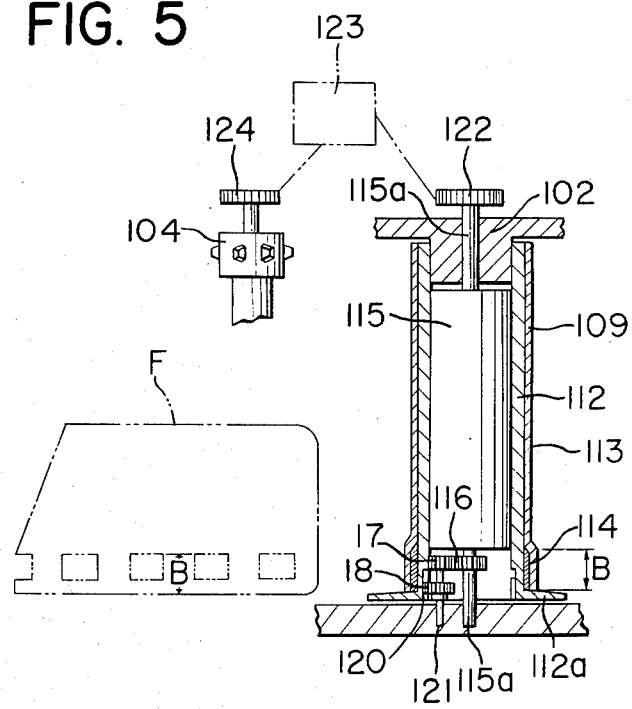
FIG. 5 is a longitudinal sectional view of the film take-up drum.

In FIGS. 4 and 5, reference numeral 101 denotes an interchangeable objective lens, 102 indicates a camera housing, 103 denotes a back lid that is opened and closed in a swivel manner in the direction of double-headed reference arrow A—A' at a hinge 103a, 104 shows a sprocket wheel having 8 teeth (FIG. 4) or 6 teeth (FIG. 5) on its outer peripheral surface, and 105 denotes a film supply or cartridge chamber. Reference numeral 106 denotes an aperture mask, 107 indicates a pressure plate disposed on back lid 103, and 108 refers to a film take-up chamber. Numeral 109 denotes a film take-up drum, the outside surface of which is covered by a rubber material, while 110 designates a first guiding member, one end of which is pivotally supported to a shaft by a hinge 110a so that it can swivel in order to guide the leading edge of the film advancing along the wall of the film take-up chamber to film take-up drum 109, and to which member 110 a counterclockwise urgency is applied by a spring (not shown). At the other end of guiding member 110 a roller 110b is arranged for contact with the outer or peripheral surface of drum 109.

Reference numeral 111 denotes a second guiding member attached to back lid 103 for leading the tip of the film F into contact with the outer periphery of film take-up drum 109, the film F being transported to the right in FIG. 4 by counterclockwise rotation of sprocket wheel 104. One end of second guiding member 111 is supported for partial rotation about an axis at a hinge 111a, and a roller 111b is attached to the other end of member 111 for contact with the outer periphery of drum 109 under the counterclockwise urgency of a spring (not shown).

Numeral 112 (FIG. 5) denotes the basic, inner spool of film take-up drum 109 and is provided with a flange 112a at the lower portion thereof, while 113 designates an outer, rubber spool which closely covers the outer periphery or circumference of basic spool 112. The outer diameter of the lower portion of outer spool 113 is larger over a width B by the insertion of an intermediate ring 114 between inner and outer spools 112, 113.

Reference designation 115 denotes a motor for advancing the film and is disposed within the interior of basic spool 112, the housing of motor 115 being fixed to the inner surface of spool 112 so that the motor housing unitarily rotates with spool 112. Numeral 115a indicates the rotating output shaft of motor 115, a small gear 116 being fixed to the lower end of shaft 115a and another small gear 122 being fixed to the upper end thereof. Reference numerals 17 and 18 denote intermediate double gears which are both secured to a common intermediate shaft 121 rotatably fitted to camera housing 102, and gear 17 is in mesh with small gear 116 at the lower end of motor shaft 115a, while gear 18 is in mesh with an internal gear 120 which is formed within and at the lower end of basic spool 112.

In addition, a small gear 122 at the upper end of motor 115 connects with a driving gear 124 of sprocket wheel 104 through a rotation controlling device 123. The rotation controlling device is that which controls the rotation of sprocket wheel 104 and which forceably stops rotation of motor 115 and of sprocket wheel 104 at the same time when sprocket wheel 104 has completed the required rotation (i.e. that required to transport the film an initial length equivalent to several picture frames in preparation for taking pictures immediately after film loading, and that rotation required to transport the film a single picture frame after each frame is exposed.) Reference numeral 125 denotes a film cartridge.

Figure 6:
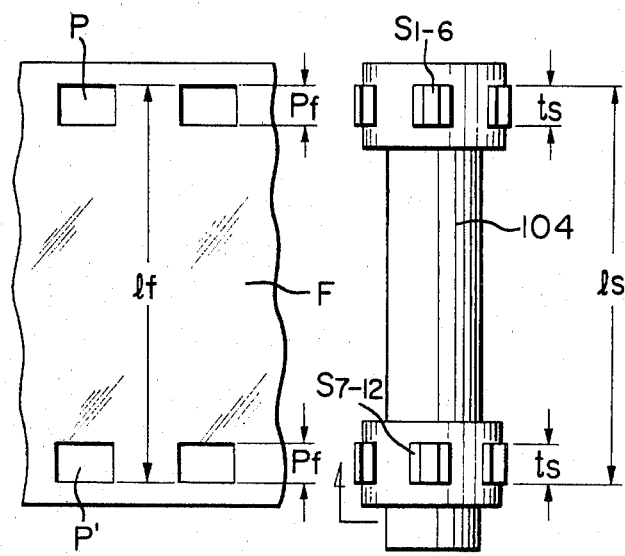
FIGS. 6 and 7 are views showing the correlation, and different manners of engagement, respectively, between the inventive sprocket wheel and the perforations in the film.

FIGS. 6 and 7 show the correlation between sprocket wheel 104 and the perforations P—P' of the strip film F. The sprocket wheel 104 in this example has two rows of teeth, S1–S6 and S7–S12, peripherally disposed about opposite ends, and each of which rows comprises six teeth for meshing engagement with the corresponding perforations P and P' disposed along opposite edges of the film F. The spacing between the upper surface of teeth S1–S6 in the upper row shown in FIG. 6 and the lower surface of the teeth S7–S12 in the lower row shown in FIG. 6—that is, the spacing ls between both outside surfaces of the teeth of the two rows, S1–S6 and S7–S12—is shorter than the spacing lf between the lower edge of the perforation P shown in FIG. 6 and the lower edge of the perforation P' shown in FIG. 6—that is, the spacing lf between the respective outside edges of the perforations P and P'. Put another way, $$lf - ls = \Delta l$$

In addition, the width ts of each tooth in the rows S1–S6 and S7–S12 is formed narrower than the width Pf of each perforation of the perforations P and P'; that is, $$ts < Pf - \Delta l$$

Figure 7A:
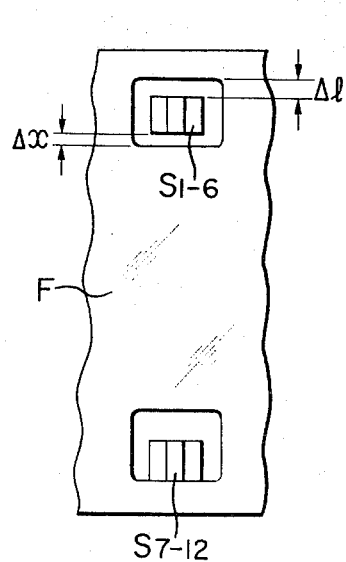
Figure 7B:
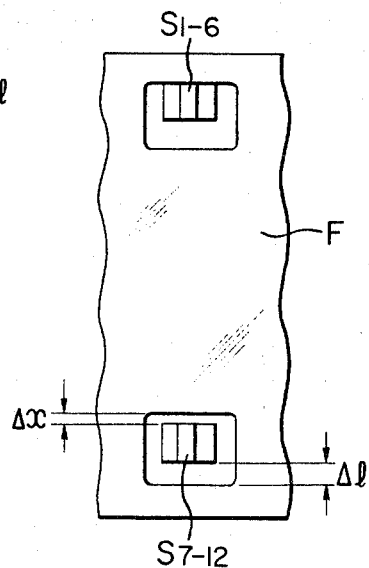

Therefore, in the event that the film F is transversely displaced either high or low relative to the position of sprocket wheel 104 as shown in FIGS. 7A and 7B, the outside edge of at least one row of the perforations P or P' is assured of touching the outside surface of the corresponding row of teeth S1-6 or S7–12 of sprocket wheel 104.

Figure 1:
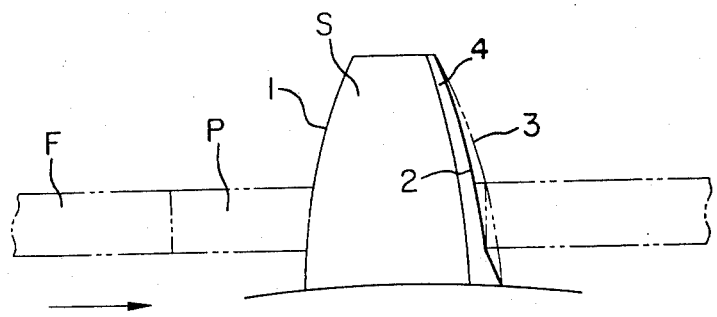
FIG. 1 is a side view showing a sprocket tooth in accordance with an embodiment of the invention.
Figure 2:
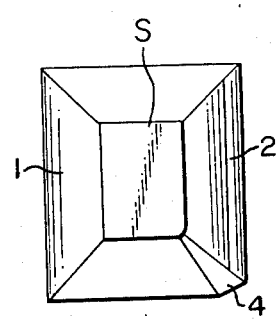
FIG. 2 is a top plan view of the sprocket tooth of FIG. 1.
Figure 3:
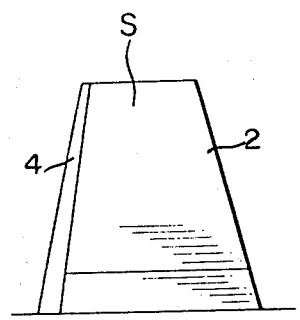
FIG. 3 is a front view of the sprocket tooth of FIGS. 1 and 2.

FIGS. 1–3 are views of the form or configuration of each tooth S in the rows of teeth S1–S6 and S7–S12 of the sprocket wheel, FIG. 1 being a side view along the reference arrow shown in FIG. 6, FIG. 2 being a top plan view of the FIG. 1 tooth, and FIG. 3 being a front view. F denotes a strip of film placed on a film transporting surface of the camera body and transported in the direction of the reference arrow by rotation of sprocket wheel 104 (which is correspondingly effected by operation of motor 115 during the film winding operation). The tooth S has a rear surface 1 facing the film supplying chamber and imparted with an involute gear profile as in conventional sprocket wheels. Reference numeral 2 designates a front tooth surface facing the film take-up chamber. Tooth surface 2 is imparted with a profile in accordance with the invention, the conventional involute form of tooth surface 3 being imposed, for purposes of comparison, in dash-dot line. As indicated by the solid line, the portion of tooth surface 2 according to the invention which is located at the film feeding plane forms an angle more closely approximating a right angle therewith than the corresponding portion of conventional tooth surface 3. As a consequence, the thrusting or pushing force component applied to an edge of each film perforation by front tooth surface 2 is obviously greater than that applied by conventional tooth surface 3. In other words, when the sprocket wheel is rotated in the clockwise direction (in FIG. 1), a major portion of the rotation torque is utilized for displacing the film F along the feeding plane, whereby disengagement as well as floating of the film can be positively prevented—i.e. the film is essentially stopped from riding up or rising along the tooth surface.

With the tooth surface 2 according to the invention, relative sliding movement or displacement between the sprocket wheel and the film is greater than that occurring with a conventional, involute tooth surface. However, since movement of film in the camera is, in principle, a single reciprocation, this greater relative sliding displacement will bring about no disadvantages. The remaining portion of tooth surface 2 is profiled with greater perpendicularity to the film feeding plane than the conventional involute tooth surface.

The positional relationship between the perforations defined along opposite transverse edges of the film and the sprocket wheel teeth is so selected that, upon transverse positional deviation of the film F in either the upward or downward direction, the outer side or outside surface of a sprocket tooth will abut against a side edge of the corresponding perforation before (and thereby preventing contact of) the inside surface of the oppositely disposed tooth with its corresponding perforation. In this connection, it is noted that corners of each perforation P are rounded. In order to assure more effective action of the tooth surface 2 in accordance with the invention, it is preferred that at least a ridge 4 adapted to abut against the side edge of the perforation (i.e. at the intersection between the outer side surface of the sprocket tooth and the front tooth surface facing toward the film take-up chamber) be rounded or chamfered (FIGS. 1–3).

The sprocket gear wheel according to the invention can be formed of a metallic material through machining. However, fabrication of the sprocket wheel is greatly facilitated when it is formed of a synthetic resin material.

The curved surface of the sprocket tooth according to the invention can be designed in consideration of the size, thickness and material of film to be used therewith, as well as of the height, material, and position of the guide roller, and of other factors, so that the film floating phenomenon otherwise ascribable to the film feeding operation can be positively prevented.

What is claimed is:

1. An improved sprocket wheel for substantially planar feeding of a strip of film in a photographic camera by applying a thrust to end edges of two parallel and spaced apart rows of perforations provided along the film strip through penetrating engagement in the perforations, and wherein each of the film strip perforations includes at least a rounded corner, the improvement comprising:

at least a train of film penetrating and feeding teeth on said sprocket wheel, each of said teeth including a curved film thrusting surface confronting the plane along which film is fed in the camera and comprising a base portion having a more gentle slope with respect to the film feeding plane than a corresponding surface of an involute tooth profile and an upper portion having a steeper slope with respect to the film feeding plane than the corresponding surface of an involute tooth profile, said sprocket wheel further including a second train of film feeding teeth such that each of said trains is engageable with a respective one of said rows of perforations on the film strip, an outer side surface on each of said teeth, and a ridge defined between said outer side surface and said film thrusting surface of each tooth, said ridge being rounded so as to conform to the rounded corner of each perforation on the film strip and thereby facilitate smooth feeding of film by said sprocket wheel in the camera.

2. An improved sprocket wheel according to claim 1, wherein at least the individual teeth of said sprocket wheel are formed of a synthetic resin material.

* * * * *